May 20, 1952  C. G. CUMMINS  2,597,458

TIRE LUG CONSTRUCTION

Filed Aug. 15, 1949

INVENTOR.
Clyde G. Cummins
BY
Sam J. Slotky
ATTORNEY

Patented May 20, 1952

2,597,458

UNITED STATES PATENT OFFICE 2,597,458

TIRE LUG CONSTRUCTION

Clyde G. Cummins, Sioux City, Iowa

Application August 15, 1949, Serial No. 110,351

1 Claim. (Cl. 152—225)

My invention relates to a tire lug construction.

An object of my invention is to provide a device having tire lugs, which lugs can be readily applied to the tires, and includes means for mutually supporting the lugs as a unit.

A further object of my invention is to provide such an arrangement wherein the lugs will be radially positioned with respect to the tire, and wherein the lugs can be securely tightened to grip the tire.

A further object of my invention is to provide an abutment and gripping member which will be snugly retained against the hub of the wheel to which the tire is attached, and which is resilient.

A further object of my invention is to provide an arrangement which can be folded to a compact shape when not in use.

A further object of my invention is to provide a readily detachable arrangement.

With these and other objects in view, my invention consists in the construction, arrangement, and combination of the various parts of my device, whereby the objects contemplated are attained, as hereinafter more fully set forth, pointed out in my claim, and illustrated in the accompanying drawings, in which:

Figure 1:
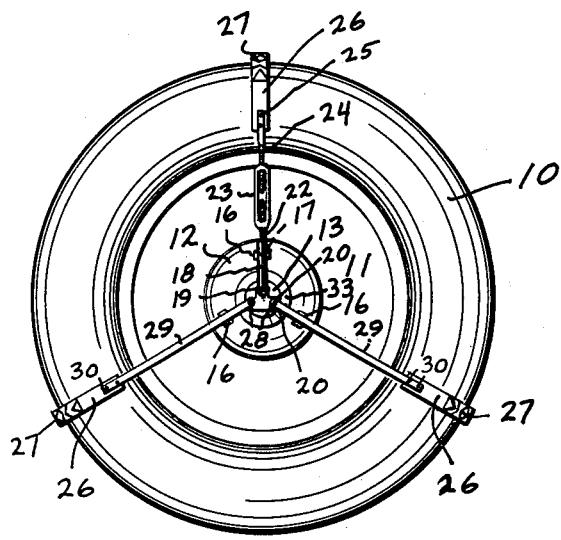
Figure 1 is a side elevation of the unit as attached to a tire.

I have used the character 10 to designate a rubber casing, and I have used the character 11 to indicate the rim of a vehicle wheel upon which the casing 10 is mounted. I have used the character 12 to designate the hub cap.

For the tire lug device I provide a circular disc member 13 and attached to the disc member 13 at 14 are the three radially positioned legs 15 which are attached to the ears 16. Pivotally attached by means of a pin 17 through one pair of ears 16 is a rod 18 which is pivotally secured at 19 to one of the ears 20 of the member 21 which also has the two other ears 20 as shown.

The member 18 extends into the threaded portion 22 which is threadably engaged with a turn-buckle 23 which turn-buckle is further threadably engaged with a further threaded member 24 which is secured at 25 to the downwardly inclined portion 26 of the traction lug member 27.

The member 27 is suitably roughened or corrugated into desired shapes to provide the desired traction. Also pivoted at 28 to the other ears 20 are the further bars 29 which pass between the ears 16 normally and are held thereby to prevent displacement when the device is in operation.

Attached to the further bars 29 at 30 are further similar traction lugs 27 having similar portions 26, the traction lugs also having the further downwardly projecting portions 31 so that the casing 10 will be received between the said portions 26 and 31.

Secured to the disc 13 by means of the machine screw 32 is a soft and pliable rubber member 33 which is hollowed at 34 to provide a soft and resilient abutment member which is applied against the hub cap 12, thereby also providing a gripping arrangement centrally of the device.

It will now be seen that the device can be readily installed on the tire casing by opening it up to the position shown in Figure 1 and using the turn-buckle 23 to tighten the arrangement whereby the lugs will all be drawn radially into engagement with the casing.

Figure 2:
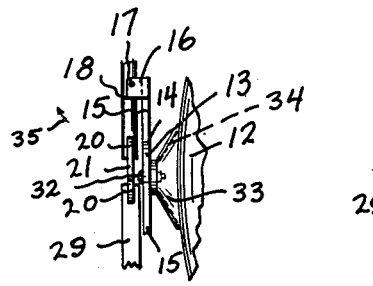
Figure 2 is a detail.
Figure 3:
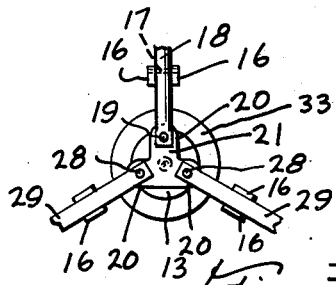
Figure 3 is a forward elevation of Figure 2.
Figure 5:
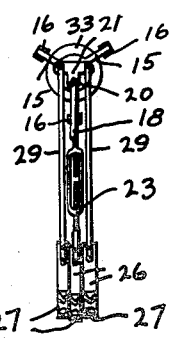
Figure 5 is a view showing the arrangement in its collapsed form.
Figure 4:
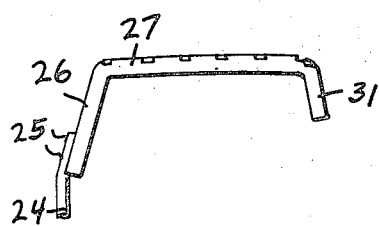
Figure 4 is a further detail of the traction lug.

It will be noted that only one of the members such as 18 is pivotally attached to a pair of ears 16. This is to allow convenient collapsion of the entire arrangement in the following manner. First, the member 18 is pivoted in the direction of the arrow 35 as shown in Figure 2 after the arrangement has been loosened so that it can be taken off of the tire. The members 29 can then be swung out of their engagement between the other ears 16 and thence pivoted downwardly so that they are parallel to the members 18 and the turn-buckle 23 and as shown in Figure 5. In this manner the device is readily collapsed to minimum space requirements and can be placed in the tool box, etc. of the vehicle.

It will now be seen that I have provided the various advantages set forth in the objects of my invention with various other advantages being readily apparent.

Some changes may be made in the construction and arrangement of the parts of my invention without departing from the real spirit and purpose of my invention, and it is my intention to cover by my claim any modified forms of structure or use of mechanical equivalents which may be reasonably included within their scope.

I claim as my invention:

A tire lug device comprising a centrally positioned hub engaging member including a plurality of radially positioned legs extending therefrom, a centrally positioned member including radially positioned ears extending therefrom, a plurality of radially positioned bars pivotally attached to said ears, tire engaging lugs attached to said bars, means for tightening said lugs against a tire including a turn-buckle threadably engaged with one of said bars, said legs having upstanding ears for receiving said bars therebetween to prevent displacement thereof.

CLYDE G. CUMMINS.

REFERENCES CITED

The following references are of record in the file of this patent:

UNITED STATES PATENTS

| Number | Name | Date |
|---|---|---|
| 1,777,928 | Marsch | Oct. 7, 1930 |
| 2,477,051 | Eisenhauer | July 26, 1949 |
| 2,485,544 | Angermann | Oct. 25, 1949 |